United States Patent [19]

Calaceto

[11] Patent Number: 4,460,517
[45] Date of Patent: Jul. 17, 1984

[54] COMPACT VENTURI-TYPE SCRUBBER

[76] Inventor: Ralph R. Calaceto, 248 Palmer Ct., Ridgewood, N.J. 07450

[21] Appl. No.: 396,517

[22] Filed: Jul. 8, 1982

[51] Int. Cl.³ ............................................. B01F 3/04
[52] U.S. Cl. ......................... 261/23 R; 261/DIG. 54; 261/DIG. 9; 261/62
[58] Field of Search .......... 261/DIG. 54, 62, DIG. 9, 261/23 R

[56] References Cited

U.S. PATENT DOCUMENTS

| | | | |
|---|---|---|---|
| 2,484,277 | 10/1949 | Fisher | 261/DIG. 54 |
| 2,797,904 | 7/1957 | Voorheis | 261/DIG. 54 |
| 3,221,475 | 12/1965 | Wiemer | 261/DIG. 54 |
| 3,332,214 | 7/1967 | Huppke | 261/DIG. 54 |
| 3,339,344 | 9/1967 | Pallinger | 261/DIG. 54 |
| 3,388,897 | 6/1968 | Calaceto | 261/DIG. 54 |
| 3,574,562 | 4/1971 | Kawahata | 261/DIG. 54 |
| 3,601,374 | 8/1971 | Wheeler | 261/DIG. 54 |
| 3,638,924 | 2/1972 | Calaceto et al. | 261/DIG. 54 |
| 3,685,261 | 8/1972 | McIllvaine | 261/DIG. 54 |
| 3,767,177 | 10/1973 | Engalitcheff, Jr. et al. | 261/DIG. 54 |
| 3,841,061 | 10/1974 | Pike | 261/DIG. 54 |
| 3,881,898 | 5/1975 | Darby et al. | 261/DIG. 54 |
| 4,193,778 | 3/1980 | Strahsner et al. | 261/DIG. 54 |
| 4,206,159 | 6/1980 | Angelini et al. | 261/DIG. 54 |
| 4,239,512 | 12/1980 | Dobias | 261/DIG. 54 |
| 4,293,524 | 10/1981 | Teller et al. | 261/DIG. 54 |

Primary Examiner—Tim R. Miles
Attorney, Agent, or Firm—Blum, Kaplan, Friedman, Silberman & Beran

[57] ABSTRACT

A venturi scrubber apparatus for separating and collecting particulate matter from gases. A stream of incoming gas is divided into a plurality of flow channels which provide input to one of a parallel plurality of venturis. Water is injected proximate the inlets of the convergent sections of the venturi passages. Alternately, a manifold also distributes water at the throat entrance along the longitudinal center line of a rectilinear throat, permitting enlargement of throat width in a range of fifteen to twenty inches with effective scrubbing. Pivoting vanes in the throat provide a variable-area throat.

13 Claims, 3 Drawing Figures

COMPACT VENTURI-TYPE SCRUBBER

BACKGROUND OF THE INVENTION

This invention relates generally to a venturi scrubber of the type used for treating gases to separate and collect suspended particulate matter and more particularly, to a venturi scrubber having a plurality of venturi throats disposed in a parallel flow arrangement. Applicants U.S. Pat. No. 3,388,897, issued June 18, 1968, discloses several constructions of venturi scrubbers having liquid injection in the accelerating portion where the gases approach the throat or contraction in the flow path. The contents of this patent are incorporated herein by reference. Although, a circular throat is illustrated in the patent, for larger gas flow volumes rectilinear throats are frequently used. Liquid flow down the converging walls of the venturi directs itself under gravity to fall on the opposite side of the venturi. In so doing, sheets of liquid tend to close the throat area. However, the throat area is penetrated by the accelerating gas which breaks the liquid sheets into droplets. The liquid droplets are a necessity for agglomerating small particles in the micron range which are conveyed with the gas stream.

Venturi scrubbers, particularly in power plant facilities which have large volumes of gas flow in the order of four-hundred thousand to a million cubic feet per minute, require cleaning of particulate matter such as fly ash which evolves from burning coal. Because energy consumption in the gas cleaning scrubber itself can become quite costly, a minimal pressure drop through the equipment is an important design parameter. Venturi scrubbers can remove a full range of particulate matter, but as the particles become smaller and smaller in size, impressed pressure drop and power input required to maintain a constant discharge collection efficiency increases. Large particles, that is, in the micron size range of two microns and larger are readily removable with an eight-inch (water) pressure drop while permitting particles smaller than that range to escape. The small particles then are ideally removed by means of a downstream apparatus such as electrostatic precipitator. Electrostatic precipitators operate optimally in handling such sub-micron particles but are not effective on larger particles. Electrostatic precipitators consume relatively little power. Accordingly, a combination of both a venturi scrubber and an electrostatic precipitator presents an ideal combination.

To achieve lower pressure drop through the venturi, lower throat velocity is necessary. At an eight inch water pressure drop, a typical throat velocity may be in the order of 170 feet per second. Thus, handling, for example, seven-hundred thousand cubic feet per minute requires a throat area of 9,882 square inches. Experience indicates that throats wider than twelve inches do not properly distribute water or recycle liquor across the throat region. Instead, a section void of liquid may occur through the middle of the throat which results in a portion of the gases passing through the scrubber in an unscrubbed state.

In the above example, for a flow of seven-hundred thousand CFM with eight-inch pressure drop and a throat width of twelve inches, the length of the throat is in the order of sixty-eight feet. In practical applications, such a construction is extremely awkward. A gas main handling seven-hundred thousand CFM would typically have a diameter of ten feet. Thus, an expansion to sixty-eight would not only be awkward but would be extremely inefficient in expansion of the flow stream to the sixty-eight foot length with extremely high energy losses.

Additionally, physical space available for such venturi scrubbers is frequently limited and thus the temptation to design with increased throat width is great, especially when the flow capacity through an existing installation must be increased. This reduces scrubbing efficiency.

What is needed is a venturi-type scrubber which has a reduced venturi length and is highly efficient in particulate separation and collection.

SUMMARY OF THE INVENTION

Generally speaking, in accordance with the invention, a venturi scrubber apparatus especially suitable for separating and collecting particulate matter from gases is provided. The stream of incoming gases is divided into a plurality of flow channels and each channel provides the input to one of a plurality of venturis arranged in parallel. Water is injected proximate the leading end of the convergent surfaces of the venturi passages in accordance with the above mentioned U.S. Pat. No. 3,388,897. A manifold also distributes water close to the venturi throat entrance along the longitudinal center line of the rectilinear throat. Addition of water at the central axis of the throat permits enlargement of the throat width in the range of fifteen to more than twenty inches without deterioration in scrubbing efficiency. Pivoting vanes may be positioned in the throat to provide a variable-area throat so that a given venturi construction operates with a pressure drop which assures proper liquid droplet distribution over a wide range of gas flow. Both central water injection at the nozzle throat and use of a plurality of venturis permit a proportionate reduction in length of the venturi throat openings. Thus, a more compact yet efficient venturi scrubber is achieved.

Accordingly, it is an object of this invention to provide an improved venturi scrubber for high capacity gas flow having a compact size.

Another object of this invention is to provide an improved venturi scrubber having liquid inputs at both the entrance and throat of the venturi passage, providing uniform liquid distribution in the gas stream.

A further object of this invention is to provide an improved venturi scrubber having a plurality of venturi channels in parallel.

Still another object of this invention is to provide an improved venturi scrubber having an enlarged throat and maintaining high scrubbing efficiency.

A further object is to provide an improved venturi scrubber having pressure control means providing high scrubbing efficiency over a wide range of gas flow.

Yet another object of this invention is to provide an improved venturi scrubber having pressure drop control by means of a variable area venturi throat.

Still other objects and advantages of the invention will in part be obvious and will in part be apparent from the specification.

The invention accordingly comprises the features of the construction, combination of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
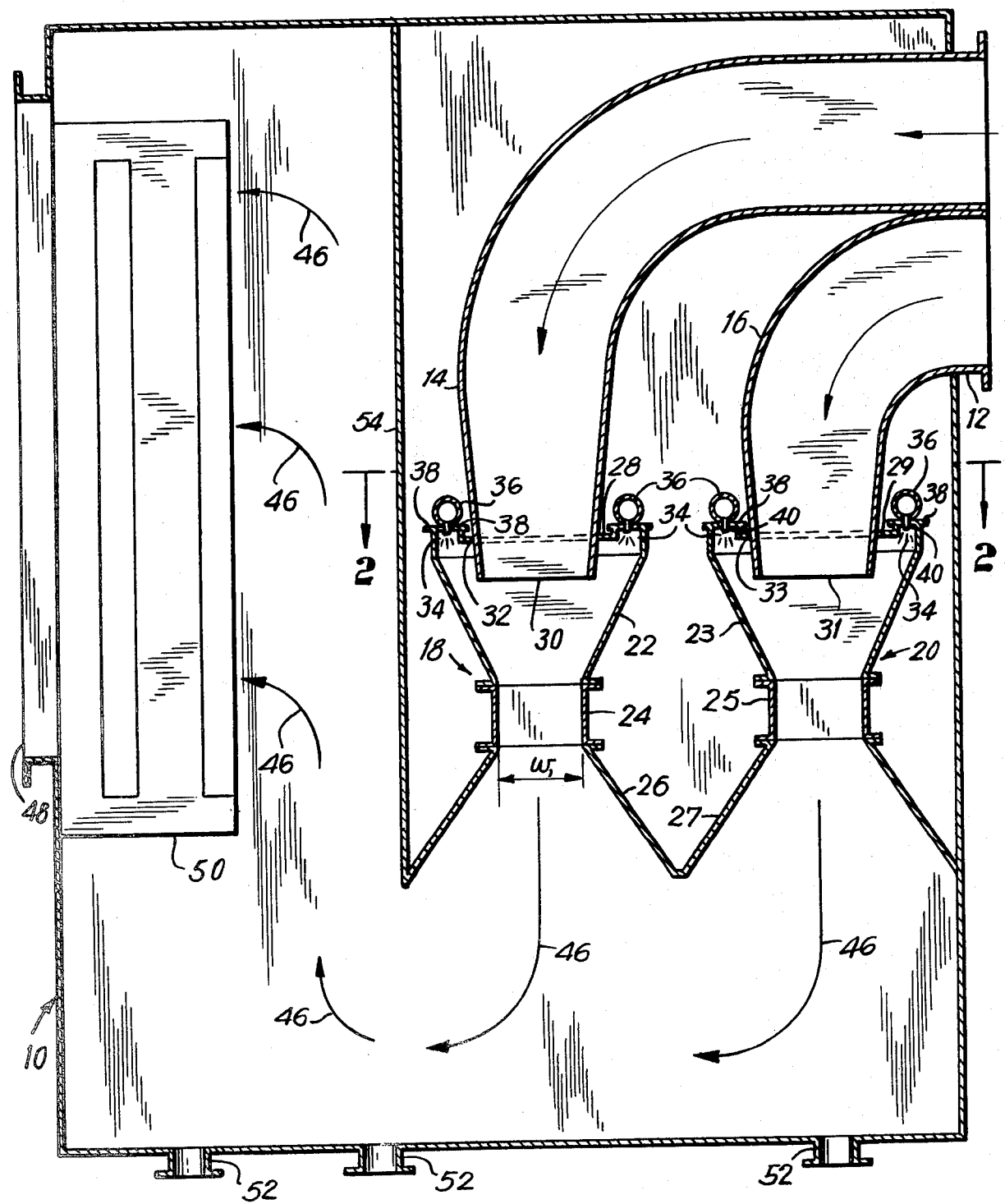
FIG. 1 is a side elevational view of a venturi scrubber in accordance with the invention.
Figure 2:
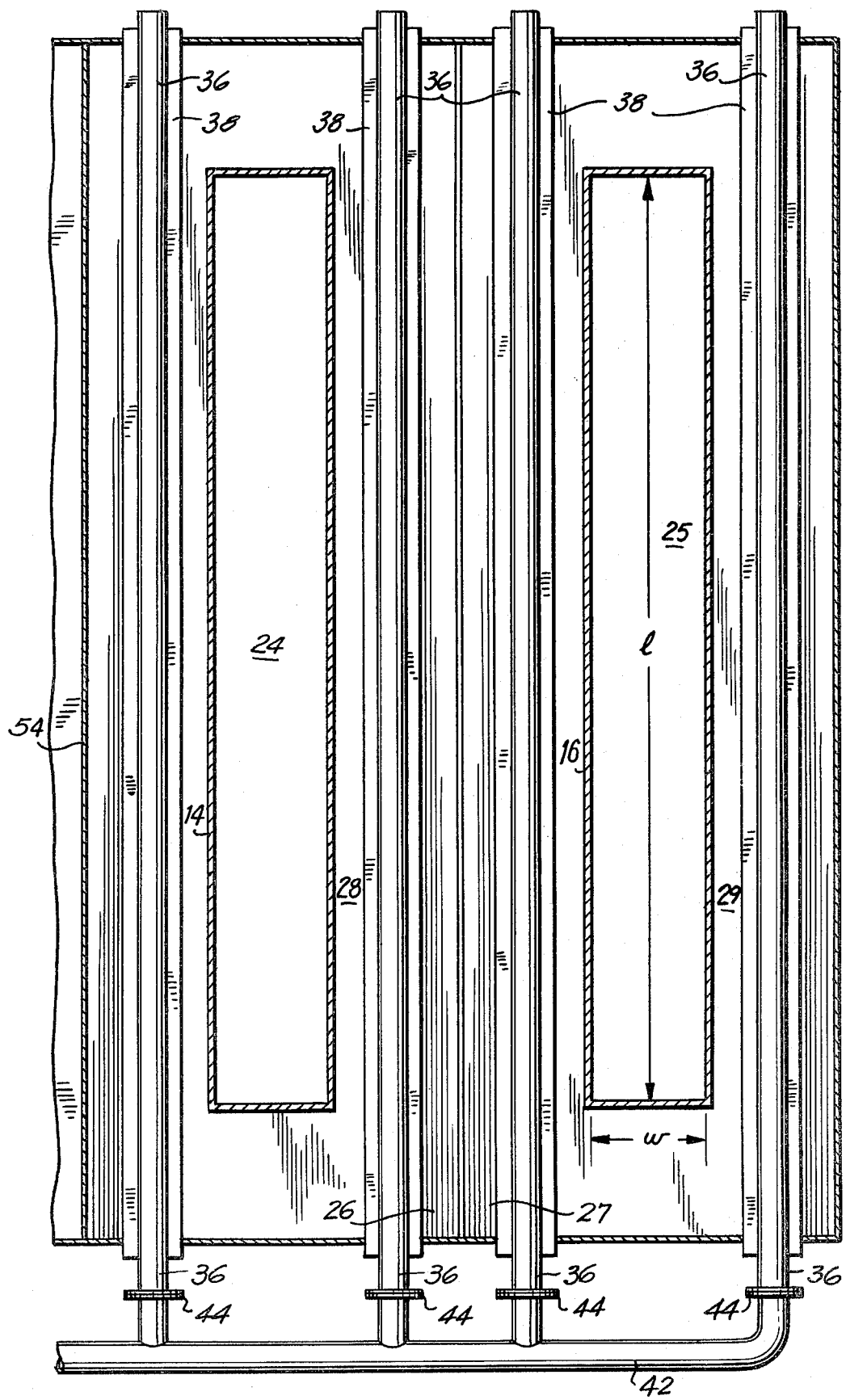
FIG. 2 is a view taken along the lines 2—2 of FIG. 1.

With reference to FIGS. 1 and 2, the venturi scrubber in accordance with the invention includes a housing 10 having an inlet duct 12 through which gases containing particulate matter enter the housing 10 for removal at least in part from the gas stream of the particulate matter. The inlet duct 12 is divided internally of the housing 10 into a pair of channels 14, 16 which bend in the downward direction as illustrated. Each channel 14, 16 directs a stream of gas to a respective venturi assembly 18, 20, including converging sections 22, 23, throats 24, 25, and divergent or diffusing sections 26, 27.

The converging sections 22, 23 are closed off at the inlets, by substantially flat plates 28, 29. The discharge ends 30, 31 of the channels 14, 16, respectively, extend through the flat plates 28, 29 partially into the converging sections 22, 23. In a construction as illustrated, the two venturi assemblies 18, 20 are of similar dimensions but it should be understood that this is not a criterion for performance but does lend itself to economical fabrication. Accordingly, any description of one venturi assembly applies equally to both.

The venturi throat 24 is rectangular, as best seen in FIG. 2, having a width w and a length l. Spray chambers 34 are formed by a step in the flat plate 28. Pipes 36 rest on the offset portions 38 of the flat plate 28, and nozzles, spaced apart at regular intervals along the pipes 36 extend through the offset portion 38 into the spray chambers 34. The pipes 36 are fed from a common manifold 42 which is removably connected to pipes 36 by means of a flange joint 44.

As explained more fully hereinafter, the gases entering through the duct 12 and passing through the venturi assemblies 18, 20 are discharged from the housing 10 after making several turns including a 180° turn followed by a 90° turn as indicated by the arrows 46. The housing 10 may also include prior to its discharge opening 48 an entrainment elminator 50 to remove droplets and particles remaining in the gas stream, or in an alternative embodiment in accordance with the invention, the gases may be discharged from the housing 10 through the discharge opening 48 and then be ducted to another device, for example, a cyclone separator (not shown), to remove entrained liquid and solid material. The entrainment eliminator 50 is not a novel portion of this invention and accordingly, no further description is provided herein.

A plurality of drains 52 provide for removal of excess liquids introduced into the gas stream through the nozzles 40 and not carried over in the gas stream to the discharge 48. One edge of the divergent section 27 makes contact with the wall of the housing 10 and the other edge of the divergent section 27 makes contact with one edge of the divergent section 26. The other edge of the divergent section 26 makes contact with an internal wall 54 such that gases discharging through the venturi assemblies 18, 20 are isolated from the channels 14, 16, throats 24, 25 and convergent sections 22, 23. Such a partitioned construction eliminates in a large measure stagnant zones within the housing 10 where liquids and solids could collect in time.

Operation of the venturi scrubber in accordance with the invention is now explained. Gas which is to be treated is introduced through the inlet duct 12 and is divided into two streams passing respectively through the channels 14, 16 in substantially equal volumes. The gas is discharged from the channels 14, 16 into the convergent sections 22, 23 of the venturi assemblies 18, 20, respectively. Jets of water are continuously introduced into the convergent sections 22, 23 by means of the nozzles 40. Water from the nozzles 40 makes contact with the discharge ends 30, 31 of the channels 14, 16 within the convergent sections 22, 23 and cools the channel walls. By this arrangement the gases in the incoming streams are cooled in the area of the discharge ends 30, 31 by indirect contact or conduction through the channel wall. As a result in the area of the channel discharge, cooling of the gases is performed in a sensible manner. As water moves below the discharge ends 30, 31 of the channels 14, 16, the water comes into direct intimate contact with the hot gases thereby causing further cooling of the gases.

Liquid from the nozzles 40 travels downwardly along the walls of the convergent sections 22, 23 and tends to close or restrict the throats 24, 25. Gases containing the particles which are to be removed, move downwardly and as the gases approach the throat 24, 25 velocity is substantially increased as the flow area decreases. Gases moving at high velocity atomize the liquid at the throats 24, 25 breaking the liquid into droplets which are of sufficiently small size that upon collision with particles in the gases, the particles are wetted and readily agglomerate. Particles in the micron and submicron sizes are successfully separated in this way. Water combined with the agglomerated particles in part falls to the bottom of the housing 10 and is collected after flowing off through the drains 52. The remaining portion of liquid is carried in the gas stream through the discharge opening 48 after elimination of entrained particles in the eliminator 50 or in a separate device, as described above, for example, a cyclone separator.

The effectiveness of the venturi scrubber depends upon the efficiency in breaking the liquid sheets, which move down the convergent surfaces of the converging sections 22, 23, into droplets which interact with the minute particles in the gas stream. Greater turbulence provides for greater effectiveness in removing the particles but at the expense of increased energy consumption. As would be expected, especially in a short venturi, the pressure energy available in the gases upon entry at the inlet 12 is not fully recovered downstream of the venturi assemblies 22, 23. While pressure drop through the venturi depends on the gas flow rate, venturi throat area, length and angle of diffusion in the divergent downstream sections 26, 27, etc., the amount of pressure drop is generally indicative of the effectiveness of breaking the water into fine droplets and agglomerating the particulate matter. Thus, more effective cleansing requires a greater power input. Venturi scrubbers are ideally suited for removing a full range of particulate matter, but as the particles become smaller, the pressure drop and the energy consumption becomes greater and greater. Large particles in the micron size range, for example, two microns and larger are easily removable at an eight inch pressure drop (water) of the venturi assembly, but this pressure drop permits smaller particles to escape. The smaller particles can then be ideally removed in a subsequent apparatus such as an electrostatic precipitator.

In a typical application handling, for example, seven-hundred thousand cubic feet per minute of gas, throat velocity in the order of 170 feet per second occurs at an eight inch pressure drop. For such conditions, a throat having a width w greater than twelve inches does not properly distribute water across the throat region. Thus, in order to make the width w in the order of twelve inches so as to assure proper water distribution, an extended length l of the throat 24, 25 is required in the order of sixty-eight feet. By using a plurality of venturi assemblies 18, 20 as illustrated within the housing 10 of FIG. 1, the length of each throat is reduced to approximately half of that required of a single venturi. It should be understood, that in alternative embodiments in accordance with the invention, the number of venturi assemblies may be greater than two, permitting a further reduction in length l of the venturis and providing for a more compact venturi scrubber unit.

Figure 3:
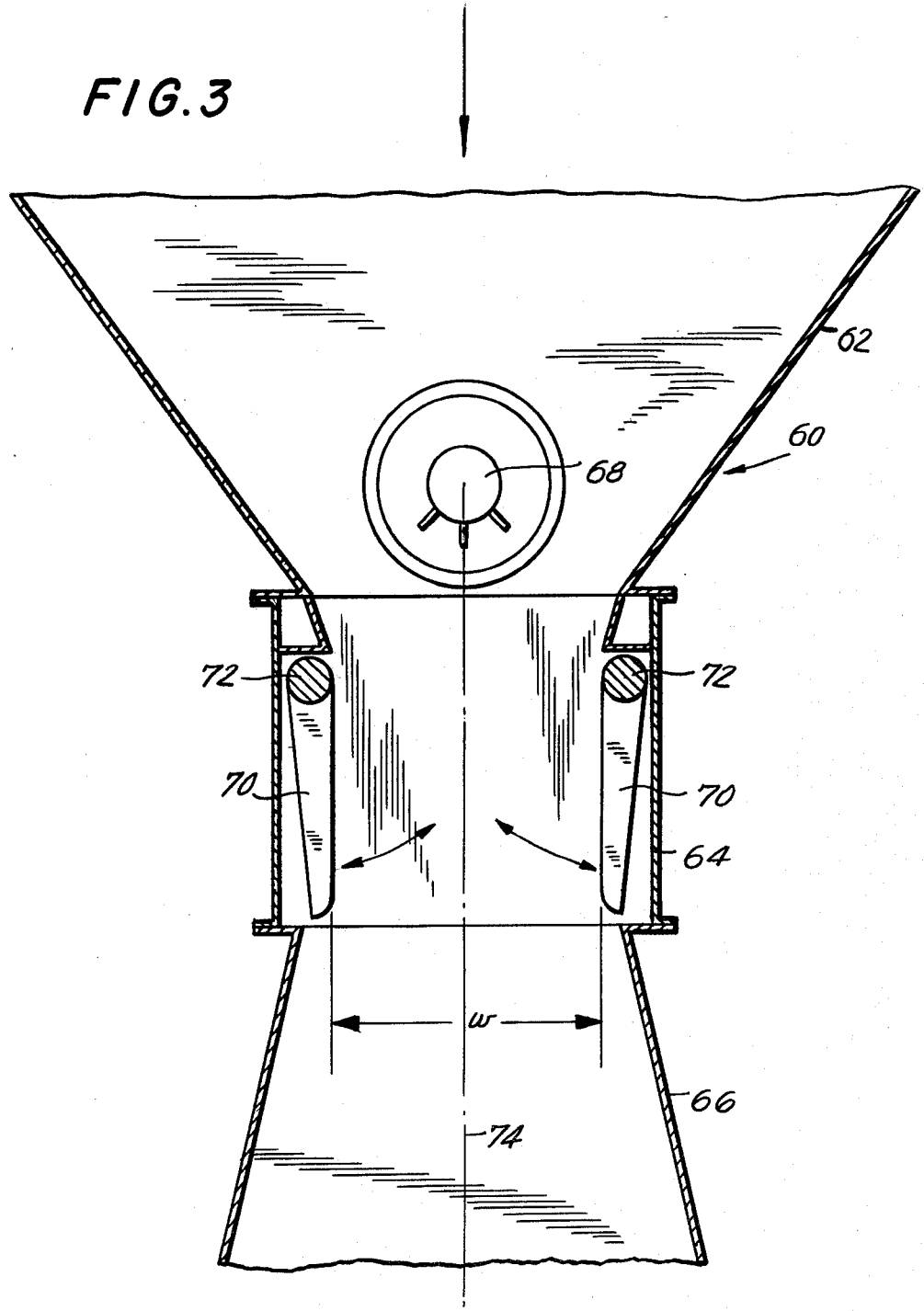
FIG. 3 is a partial side elevational view of an alternative embodiment of a venturi assembly in accordance with the invention.

The length l of the venturi throats can be further reduced if throat width w is correspondingly increased. Obviously because of the high l/w ratio, small increases in throat width w allow for large decreases in throat length l. FIG. 3 illustrates an alternative embodiment of a venturi assembly 60 in accordance with the invention. The venturi assembly includes a converging section 62, throat 64 and divergent section 66. Water in introduced into the venturi assembly 60 near the entrance to the convergent section 62 in manner similar to that shown in FIGS. 1 and 2 by means of pipes 36, nozzles 40, etc. Additionally, a central pipe 68 runs the length l of the throat and is located slightly upstream of the entrance of the throat 64. The central pipes 68 provides additional liquid at the center of the width of the throat 64. This pipe has holes or nozzles which permit the liquid to be injected or fall by gravity onto both sides of the throat entry while at the same time liquid comes down the walls of the converging section 62 as described above.

Thus, throat width w can be enlarged beyond that twelve-inch value which assures efficient droplet formation absent the central pipe 68. In this way, larger flows of gases may be treated in the venturi scrubber without loss of efficiency in droplet production and in removal of particulate matter. With an increased throat width and liquid distributed by the central pipe 68, the pressure drop is not increased even when the gas flow is substantially increased. Thus, power consumption is not inordinately high and higher volumes of gas flow are handled without increasing the overall dimensions of the scrubber housing 10. Throat width w in a range of fifteen to twenty inches operates successfully when additional liquid is provided by the central pipe 68.

In a venturi assembly, when gas flow is reduced below the design value, pressure drop through the venturi is reduced and power consumption is also reduced. Although this is a beneficial effect, the reduced pressure drop through the venturi adversely affects the efficiency of water droplet distribution in the gas flow; the removal of particulate matter is not efficiency. Accordingly, it is desirable to maintain pressure drop across the venturi assembly by restricting the throat area as gas flow volume decreases. For this purpose (FIG. 3) vanes 70, pivotably mounted by means of shafts 72 are positioned within the throat 64 and extend for the length l of the venturi throat. As gas flow is reduced, the vanes 70 are pivoted toward the center line 74, restricting the flow opening and maintaining pressure drop and effective droplet formation. As illustrated in FIG. 3, the convergent section 62 extends within the throat 64 so as to provide a substantially continuous and smooth flow path when the vanes 70 are in the open position, as illustrated.

It should also be understood that in alternative embodiments of a venturi scrubber in accordance with the invention, vanes 70 may be included in a structure as illustrated in FIG. 1 without a central pipe 68, and may be omitted from the construction of FIG. 3. It should also be understood that in an alternative embodiment of a venturi scrubber in accordance with the invention, gas flow through the venturi assembly may be in a horizontal direction rather than in a vertical direction.

When the length of the venturi throat is reduced by using a plurality of venturis, the shafts 72 for pivoting the damper vanes 70 may be of smaller diameter, and the damper vanes are more easily controlled.

Another advantage in using a plurality of venturis is in servicing wherein one or more venturis may remain open for gas flow while other venturi assemblies are closed by means of the damper vanes to allow for downstream servicing without shutting down the system. This is particularly valuable for systems which cannot be shut down.

In summary, the length of the structure, in particular, the throat of the venturi assembly is reduced by using a plurality of venturis and by widening the venturi throat. Efficiency of droplet distribution at the venturi throat is maintained by means of a supplemental liquid injection near the end of the convergent section of the venturi assembly prior to the throat. Further, movable damper vanes allow for variation in throat area so as to maintain pressure drop and liquid droplet formation at a condition of good distribution and high efficiency over a wide range of gas flow.

It can thus been seen that the objects set forth above, among those made apparent from the preceding description, are efficiently attained and, since certain changes may be made in the above construction without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A scrubber for treating a flow stream of gases for removal of particulate matter therefrom, comprising:

a housing having an inlet opening and discharge opening for passage therethrough of said gas flow;

a plurality of venturi scrubber assemblies within said housing, each said assembly including a convergent flow section, a divergent flow section, a throat positioned between said convergent and divergent sections, said throat being rectilinear having a width w and extended length l;

first means for injecting liquid onto the walls of said convergent section proximate the inlet of said convergent section;

channel means internally of said housing and separately extending from said housing inlet opening to the convergent section of each of said plurality of venturi assemblies, each venturi assembly receving a segregated portion of the total gas flow entering said housing, said channel means extending in the gas flow direction beyond the inlet of said convergent section, the discharge area of said channel means being less than the inlet area of said convergent section, said liquid being injected between said channel means and the walls of said convergent sections, said flow stream of gases meeting said liquid in said throat, said portions passing through said convergent sections, throats and divergent sections, and discharging within said housing, said gas exiting said housing through said housing discharge opening.

2. A scrubber as claimed in claim 1, wherein said first means for injecting liquid into said flow stream provides a uniform distribution of liquid along the length l of said venturi opening, adjacent the side wall surfaces of said convergent section.

3. A scrubber as claimed in claim 1, and further comprising partition means internally of said housing for defining a flow path for the flow of gases out of said divergent sections to said discharge opening.

4. A scrubber as claimed in claim 1, wherein the inlets to said convergent sections are closed by covers, said channel means extending through said covers.

5. A scrubber as claimed in claim 1, and further comprising means for varying the flow area of said throats.

6. A scrubber as claimed in claim 5, wherein said flow area is varied by varying said width w.

7. A scrubber as claimed in claim 6, wherein said width w is not more than twelve inches.

8. A scrubber as claimed in claim 6, and further comprising at least one vane extending lengthwise in said throat, said at least one vane being mounted for pivotable motion about an axis parallel to said length l, said width w and throat area being varied by pivoting said at least one vane.

9. A scrubber as claimed in claim 8, wherein the number of said vanes is two, said vanes being positioned on opposite sides of said throat.

10. A scrubber as claimed in claim 9, wherein said first means for injecting liquid into said flow stream provides a uniform distribution of liquid along the length l of said venturi opening, adjacent the side wall surfaces of said convergent section.

11. A scrubber as claimed in claim 1, and further comprising the second means for injecting liquid into said flow stream, said second means injecting liquid proximate to the discharge of said convergent section and the inlet to said throat.

12. A scrubber as claimed in claim 1, 5, or 4, and further comprising second means for injecting liquid into said flow stream, said second means injecting liquid proximate to the discharge of said convergent section and the inlet to said throat, said liquid from said second liquid injecting means being distributed uniformly along the length of said orifice throat.

13. A scrubber as claimed in claim 12, wherein said width w is in a range of fifteen to twenty inches.

* * * * *